(12) United States Patent
Kakivaya et al.

(10) Patent No.: US 8,417,775 B2
(45) Date of Patent: Apr. 9, 2013

(54) NEIGHBORHOOD MAINTENANCE IN THE FEDERATION

(75) Inventors: Gopala Krishna Reddy Kakivaya, Sammamish, WA (US); Lu Xun, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 644 days.

(21) Appl. No.: 12/038,363

(22) Filed: Feb. 27, 2008

(65) Prior Publication Data

US 2009/0213757 A1   Aug. 27, 2009

(51) Int. Cl.
*G06F 15/16* (2006.01)
*G06F 15/173* (2006.01)
*H04L 12/28* (2006.01)
*H04L 12/56* (2006.01)

(52) U.S. Cl.
USPC ........... 709/204; 709/223; 709/238; 709/243; 709/250; 709/251; 370/254; 370/400

(58) Field of Classification Search .................. 709/204, 709/223, 238, 243, 250, 251; 370/254, 400
See application file for complete search history.

(56) References Cited

U.S. PATENT DOCUMENTS

| 7,058,021 | B2 |   | 6/2006 | Srikrishna et al. | |
|---|---|---|---|---|---|
| 7,184,421 | B1 |   | 2/2007 | Liu et al. | |
| 7,362,718 | B2 | * | 4/2008 | Kakivaya et al. | 370/254 |
| 7,466,662 | B2 | * | 12/2008 | Kakivaya et al. | 370/254 |
| 7,624,194 | B2 | * | 11/2009 | Kakivaya et al. | 709/243 |
| 7,694,167 | B2 | * | 4/2010 | Kakivaya et al. | 714/4.2 |
| 8,041,773 | B2 | * | 10/2011 | Abu-Ghazaleh et al. | 709/209 |
| 2004/0128542 | A1 | * | 7/2004 | Blakley et al. | 713/201 |
| 2006/0039371 | A1 |   | 2/2006 | Castro et al. | |
| 2006/0088039 | A1 | * | 4/2006 | Kakivaya et al. | 370/400 |
| 2006/0215582 | A1 |   | 9/2006 | Castagnoli et al. | |
| 2006/0268727 | A1 |   | 11/2006 | Rangarajan et al. | |
| 2006/0282505 | A1 | * | 12/2006 | Hasha et al. | 709/207 |
| 2006/0282547 | A1 | * | 12/2006 | Hasha et al. | 709/251 |
| 2007/0127503 | A1 |   | 6/2007 | Zhao | |
| 2007/0204061 | A1 |   | 8/2007 | Chen et al. | |
| 2007/0206547 | A1 |   | 9/2007 | Gong et al. | |
| 2008/0031246 | A1 | * | 2/2008 | Hasha et al. | 370/390 |
| 2008/0288659 | A1 | * | 11/2008 | Hasha et al. | 709/250 |
| 2009/0083390 | A1 | * | 3/2009 | Abu-Ghazaleh et al. | 709/209 |

FOREIGN PATENT DOCUMENTS

WO    WO2007034313 A1    3/2007

OTHER PUBLICATIONS

Kamin Whitehouse, et al. Hood: A Neighborhood Abstraction for Sensor Networks. MobiSYS'04, Jun. 6-9, 2004, Boston, Massachusetts, USA. http://www.cs.berkeley.edu/~brewer/papers/hood04mobisys.pdf. Last accessed Oct. 5, 2007, 12 pages.

(Continued)

*Primary Examiner* — David Lazaro
*Assistant Examiner* — Vitali Korobov
(74) *Attorney, Agent, or Firm* — Zete Law, P.L.L.C.; MacLane C. Key

(57) ABSTRACT

Systems and methods that provide for joining a node to a federation. A link component facilitates joining such node thru three phases of join, introduce and advise. A plurality of messages and replies are exchanged between nodes in form of introduce, advise, and response messages. Such messages contain the sending node's full neighborhood.

20 Claims, 7 Drawing Sheets

OTHER PUBLICATIONS

Filip Perich, et al. Neighborhood-Consistent Transaction Management for Pervasive Computing Environments http://ebiquity.umbc.edu/_file_directory_/papers/1.pdf. Last accessed Oct. 5, 2007, 10 pages.

Tao Wan, et al. S-RIP: A Secure Distance Vector Routing Protocol? Proceedings of Applied Cryptography and Network Security (academic track), Yellow Mountain, China. Jun. 8-11, 2004. LNCS vol. 3089, pp. 103-119. http://www.scs.carleton.ca/~paulv/papers/ACNS04-S-RIP.pdf. Last accessed Oct. 5, 2007, 16 pages.

* cited by examiner

NEIGHBORHOOD MAINTENANCE IN THE FEDERATION

BACKGROUND

Advances in computer technology (e.g., microprocessor speed, memory capacity, data transfer bandwidth, software functionality, and the like) have generally contributed to increased computer application in various industries. Ever more powerful server systems, which are often configured as an array of servers, are commonly provided to service requests originating from external sources such as the World Wide Web, for example.

As the amount of available electronic data grows, it becomes more important to store such data in a manageable manner that facilitates user friendly and quick data searches and retrieval. Today, a common approach is to store electronic data in one or more databases. A typical database can be referred to as an organized collection of information with data structured such that a computer program can quickly search and select desired pieces of data, for example. Moreover, in such environments a federation refers to a group of organizations or service providers that have built trust among each other and enable sharing of user identity information amongst themselves.

In general, digital identity corresponds to the electronic information associated with an individual in a particular identity system. With the advent of distributed computing models such as web services, there are increased interdependencies among entities such as a Service Providers (SP's.) Accordingly, a current trend is to focus on inter-organization and inter-dependent management of identity information rather than identity management solutions for internal use. Such can be referred to as federated identity management. In general, federated identity is a distributed computing construct that recognizes that individuals move between corporate boundaries at an increasingly frequent rate. Practical applications of federated identities are represented by large multinational companies that are required to manage several heterogeneous systems at the same time. For example, such an effort can be represented by the notion of Single Sign-On (SSO), which enables a user to login to multiple organizations or SP's by using the same username and password.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation facilitates addition of a node to a federation via a link component thru three phases of join, introduce and advise. In the join phase, the joining node x routes a JOIN message targeted to its own ID. Likewise, in the introduce phase the introducing node continuously sends INTRODUCE message to nodes in its extended neighborhood to obtain a stable view of the extended neighborhood. Such extended neighborhood typically refers to a scenario wherein a node contains a plurality of advised nodes on each side (e.g. H advised nodes on each side, wherein H is an integer—as opposed to H introduced nodes on each side.) For example, when the federation is stable, every introduced node is also an advised node, and hence the two concepts are equal.

Accordingly, when there exist nodes that actively join the federation, an extended neighborhood in fact becomes larger than the neighborhood (e.g., a neighborhood being extended to form the extended neighborhood). Typically, a node attempts to maintain its neighborhood, and in an introduce phase the introducing node will try to maintain an extended neighborhood. Such introduce phase supplies a snapshot of the extended neighborhood that typically ensures accuracy at some point of time.

Every node receiving the INTRODUCE message can respond with an INTRODUCERESPONSE message. Both messages contain the sending node's full neighborhood. Similarly, the advise phase will actually insert the advising node into its neighbor's neighborhood, wherein an advising node continuously sends ADVISE message to nodes in its extended neighborhood, to obtain a stable view of extended neighborhood. It is to be appreciated that such extended neighborhood can be different from the one when it completes the Introduce phase. Every node receiving the ADVISE message will simply reply with an ADVISERESPONSE message. Both messages contain the sender's full neighborhood.

In a related methodology, when a node boots up it can create an empty neighborhood with a neighborhood range that only covers its own node ID; and hence the node has no knowledge of the federation except for itself. After a node boots up, it can exchange messages with each other. For every message, the sending node can include nodes in its full neighborhood and its neighborhood range in the message so that the receiving node can update its neighborhood using the information in the message.

The nodes are part of a Federation, which represents a collection of domains that have established trust. The level of trust can vary, but typically include authentication and authorization. In general, a federation of the subject innovation can include a number of organizations that have established trust for shared access to a set of resources. At no time two nodes will ever claim ownership of the same token, and a message destined to the given id at any moment is accepted only by that node—(e.g., a safety property). Moreover, when a message is repeatedly sent to a target id, it is eventually accepted, (e.g., a liveness property.)

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
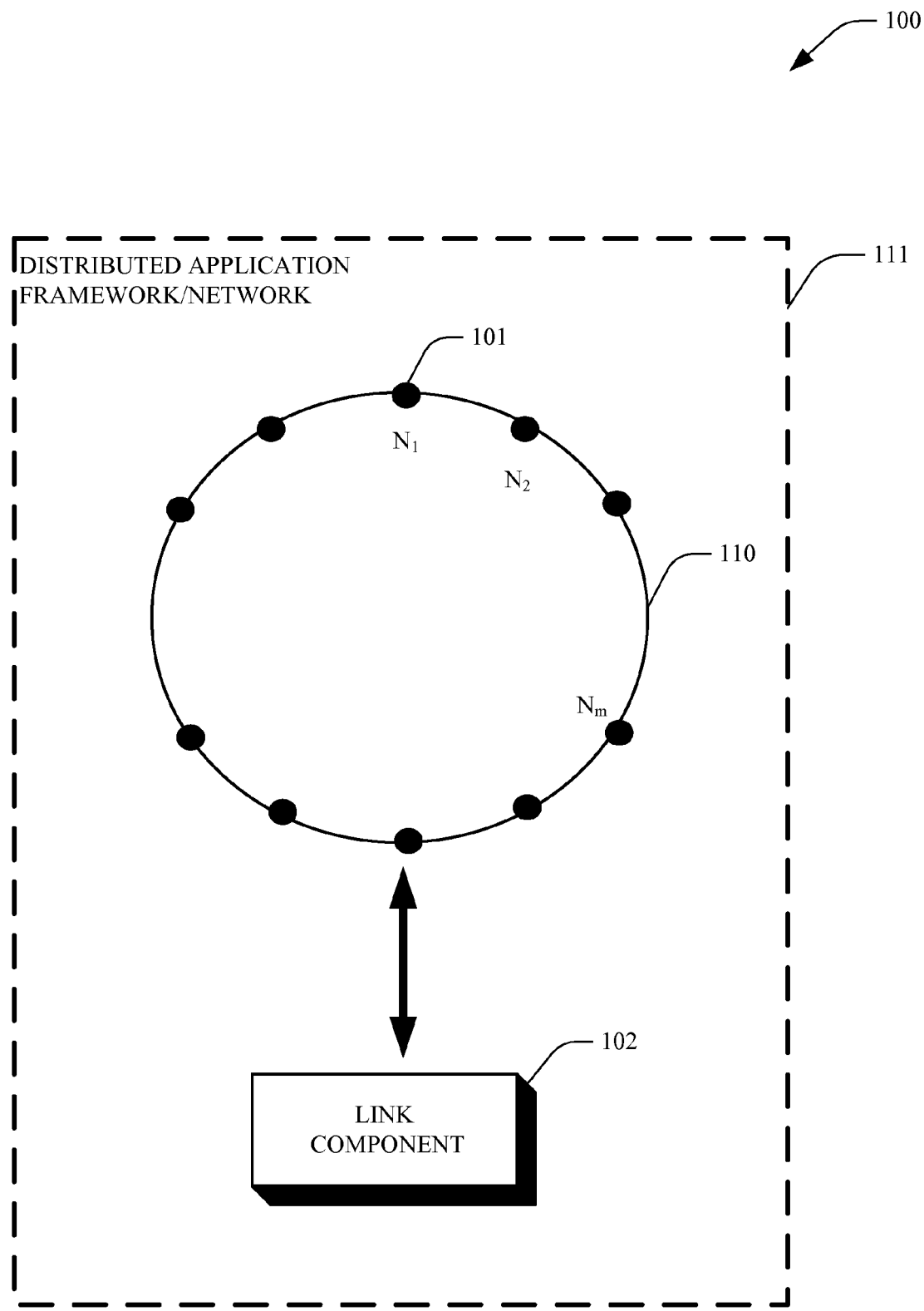
FIG. 1 illustrates a block diagram of a system that employs a link component that is associated with a plurality of nodes in accordance with an aspect of the subject innovation.

FIG. 1 illustrates a block diagram of a system 100 that implements a link component in conjunction with a plurality of nodes 101 as part of a ring 110 in accordance with an aspect of the subject innovation. The link component 102 facilitates addition of a node to the federation 110 as part of a distributed application framework/network 111.

Typically, the ring 110 is associated with a federation that can consist of the set of nodes that cooperate among themselves to form a dynamic and scalable network, wherein information can be systematically and efficiently disseminated and located. Moreover, the nodes can participate in a federation as a sorted list using a binary relation that is reflexive, anti-symmetric, transitive, total, and defined over the domain of node identities. For example, both ends of the sorted list can be joined, thereby forming a ring 110. Such provides for each node in the list to view itself as being at the middle of the sorted list. In a related aspect, the list can be doubly linked such that a node can traverse the list in either direction. Moreover, a one-to-one mapping function can be defined from the value domain of the node identities to the nodes themselves. Such mapping function accounts for the sparseness of the nodes in the value domain when the mapping is not tight.

As such, every node participating in the federation is assigned a natural number that is between 0 and some appropriately chosen upper bound, inclusive, and such that the range does not have to be consecutive—e.g., there can exist gaps between numbers assigned to nodes. Such number assigned to a node acts as its identity in the ring. The mapping function accounts for gaps in the number space by mapping a number being positioned in between two node identities to the node having an identity that is numerically closest to the number. Accordingly, by assigning each node a uniformly distributed number, it can be ensured that all segments of the ring are uniformly populated. Moreover and as described in detail infra, nodes that indicate the successor, predecessor, and neighborhood computations can be performed efficiently using modulo arithmetic.

Typically, every node maintains a neighborhood of H nodes (H being an integer) that are closest to it on each side. N(X) denotes the set of neighbors of node X, wherein Neighborhood edge is a node in N(X) that is furthest away from X. Every node has a neighborhood edge on each of the predecessor and successor directions. If a node Y is in N(X), Y is referred to as being IN X's neighborhood. If Y is closer to X than X's neighborhood edge (on the same side of X), Y is said to be WITHIN X's neighborhood. It is to be appreciated that it is possible for Y to be within X's neighborhood but not in the neighborhood if X is not aware of the existence of Y. Accordingly for a Node X, the subject innovation enables that if there exists another ready node Y that is within X's neighborhood—then Y must also be in X's neighborhood.

Figure 2:
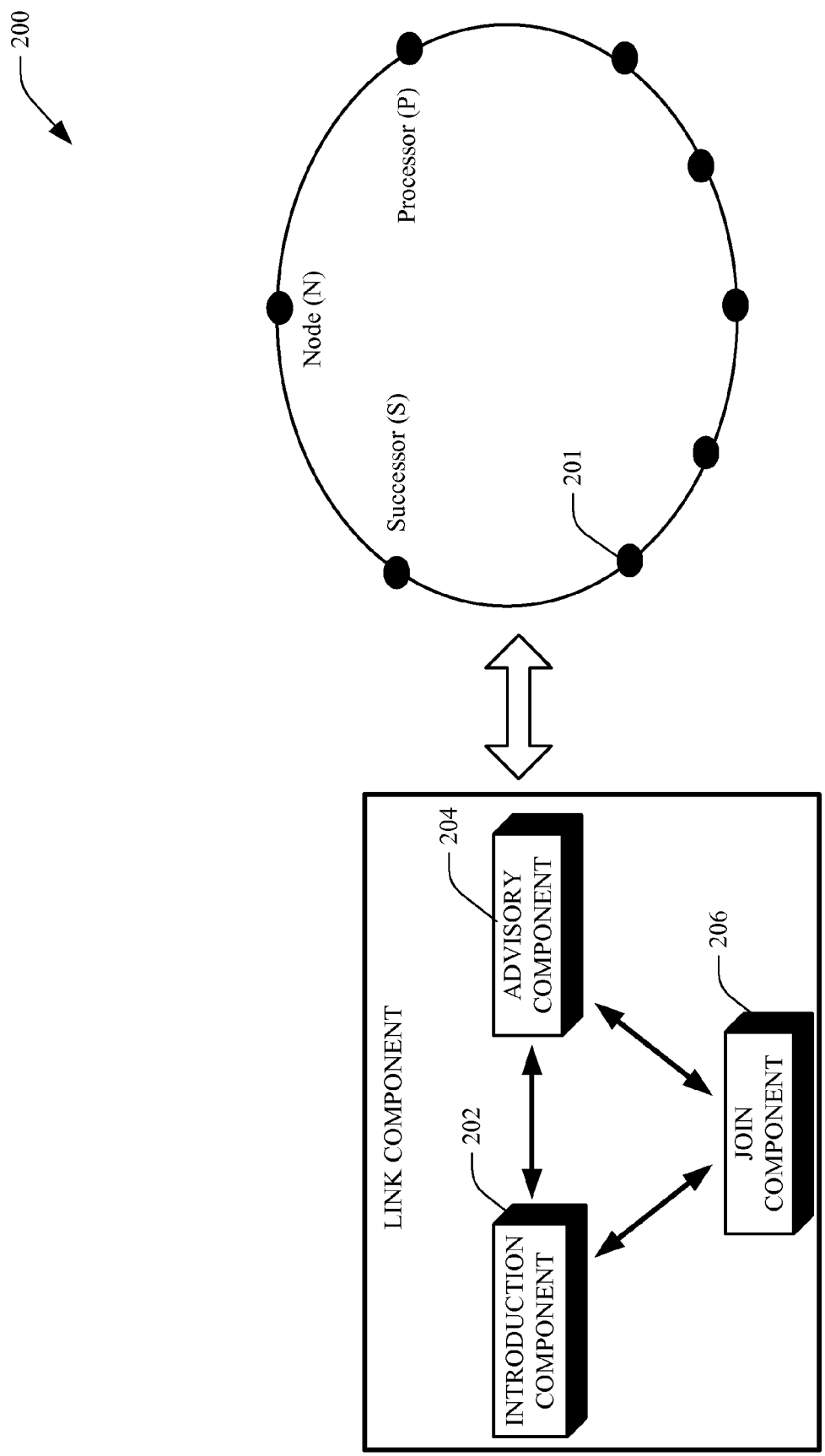
FIG. 2 illustrates a block diagram of a link component that further incorporates an introduction component, an advisory component and a join component in accordance with an aspect of the subject innovation.

FIG. 2 illustrates a system 200 of a distributed application framework that implements a link component that incorporates an introduction component 202, an advisory component 204, and a join component 206 in accordance with an aspect of the subject innovation. The join component implements the join phase, wherein the joining node X routes a JOIN message targeted to its own ID. This message will be received by the existing node Y that is closest to X. Y will send back a JOINRESPONSE message containing Y's full neighborhood. When X receives the JOINRESPONSE message, it can get its initial view of its neighborhood from the message. Note that X is in Y's full neighborhood but not considered as a member in Y's neighborhood yet because X has not gone through the introduce phase.

Likewise, the introduction component 202 continuously sends INTRODUCE message to nodes in its extended neighborhood until it obtains a stable view of the extended neighborhood. Every node receiving the INTRODUCE message will respond with an INTRODUCERESPONSE message. Both messages contain the sending node's full neighborhood.

In general the following acts can be performed based on encountered conditions

1. If the introducing node already has a view of its extended neighborhood, act or step 2 below can be performed, wherein the introducing node can obtain such a view from the JOINRESPONSE message directly if every introduced node contained in the JOINRESPONSE message is also an advised node, which is the typical case. Otherwise, it will keep sending INTRODUCE message to introduced nodes in its current view of (partial) extended neighborhood and update its view from the response. Such act is repeated until the introducing node obtains H advised node on each side.

2. When the introducing node obtains an initial view of its extended neighborhood, it tries to confirm that this view remains accurate. To do so, it sends an INTRODUCE message to every INTRODUCED node IN the extended neighborhood, plus every introducing node WITHIN the extended neighborhood. Whenever an INTRODUCERESPONSE message is received, it checks to see whether it needs to update its extended neighborhood or not. If so, such indicates that the initial view of extended neighborhood is no longer correct. It will then start from the updated extended neighborhood and repeat act or this step 2.

3. If the introducing node has received all the responses and its extended neighborhood does not change, it will complete the introduce phase and becomes an introduced node.

4. If during the process the introducing node loses the entire of its neighborhood on either side (all neighbors are down), it will return to the join phase.

It is to be appreciated that at the end of this phase, the introducing node has not been added to any other node's neighborhood yet because none of them will know that it has become introduced. However, they are aware that the node as introducing in their full neighborhood.

Similarly, the advisory component can implement the advisory phase that actually inserts the advising node into its neighbor's neighborhood, wherein an advising node continuously sends ADVISE message to nodes in its extended neighborhood, to obtain a stable view of extended neighborhood—(It is further appreciated that this extended neighborhood can be different from the one when it completes the Introduce phase). Every node receiving the ADVISE message will simply reply with an ADVISERESPONSE message. Both messages contain the sender's full neighborhood.

Exemplary details on the advising node side can be performed according to the following acts:

1. The advising node starts from an initial view of its extended neighborhood (note that at the end of the introduce phase it typically must have such a view). It sends an ADVISE message to every INTRODUCED node IN the extended neighborhood, plus every introducing node WITHIN the extended neighborhood. Whenever an ADVISEERESPONSE message is received, it checks to see whether it needs to update its extended neighborhood or not. If so, such indicates that the initial view of extended neighborhood is no longer correct. It will then start from the updated extended neighborhood and repeat act or this step 1.
2. If the advising node has received all the responses and its extended neighborhood does not change, it will complete the advise phase and becomes an advised node.
3. If during the process the advising node loses the entire of its neighborhood on either side (all neighbors are down), it will go back to the join phase.

It is to be appreciated that at the end of such phase, every node in its neighborhood must typically have added it into their neighborhood. After the advise phase the node will transition into the synchronize phase where it can acquire routing token. Accordingly, with the combination of the neighborhood update/extension protocol and the join protocol, the federation can provide the neighborhood consistency guarantee, which is base for high level consistency guarantees such as routing consistency.

Figure 3:
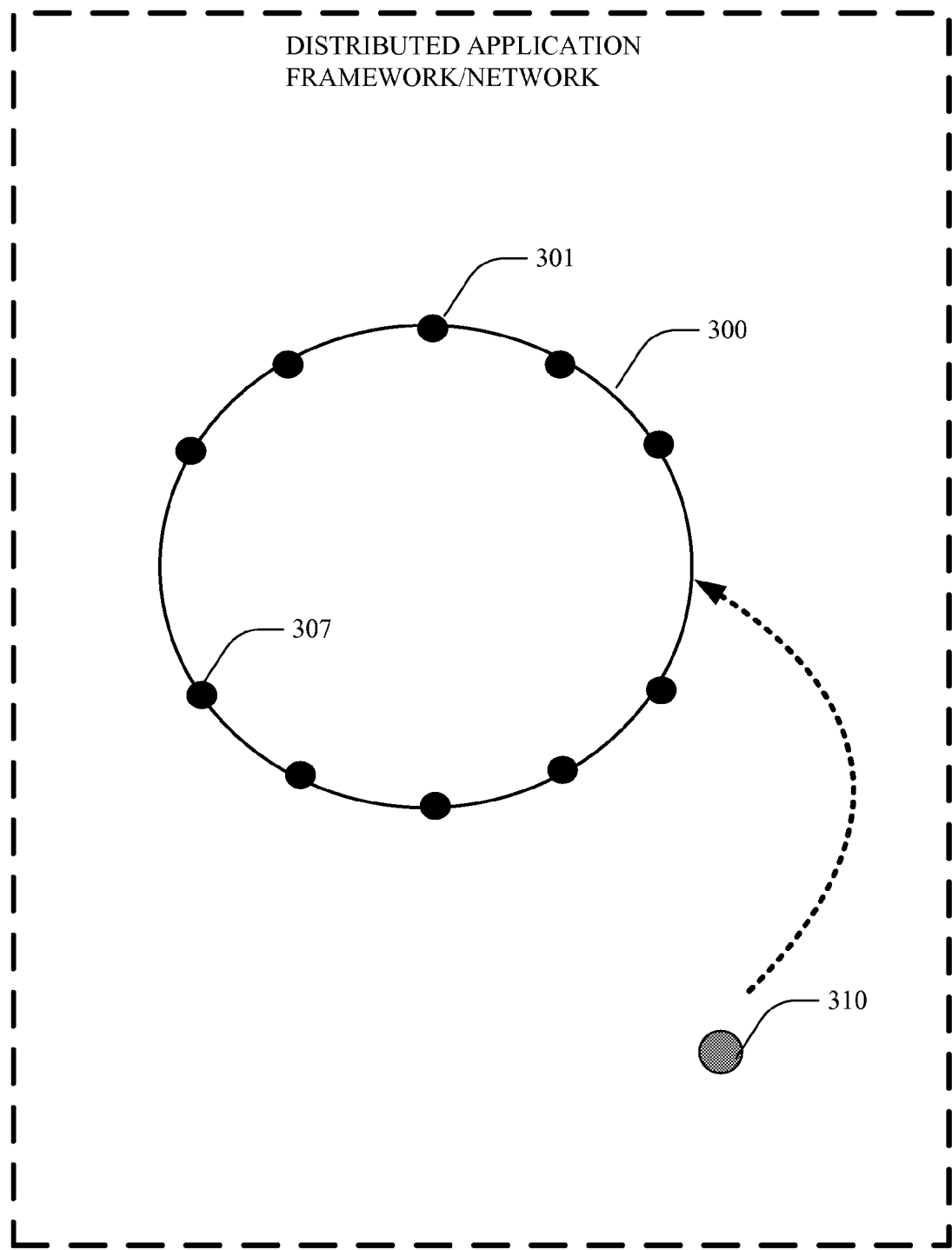
FIG. 3 illustrates a node that joins a ring of nodes for a system in accordance with an aspect of the subject innovation.

FIG. 3 illustrates a block diagram for a node 310 that joins a network 300 in accordance with an aspect of the subject innovation. In general, when the first node in the federation comes up (e.g., 301), it becomes aware (e.g., via a discovery mechanism, external input and the like) that there are no existing nodes in the federation, wherein the first node can create an empty neighborhood with a neighborhood range of the entire number space. When any other node (e.g., 307) boots up it can create an empty neighborhood with a neighborhood range that only covers its own node ID; and hence the node has no knowledge of the federation except for itself. After a node boots up, it can exchange messages with each other. For every message, the sending node can include nodes in its full neighborhood and its neighborhood range in the message so that the receiving node can update its neighborhood using the information in the message. The update of the neighborhood typically follows the rules below:

If a new node X comes to know a new introduced node Y, and Y is WITHIN X's neighborhood, X will add Y into its neighborhood. If after that there are more than H nodes (H being an integer) on either side, X will remove the edge node from its neighborhood and adjust its neighborhood range.

If node Y is IN X's neighborhood and it becomes shutdown, X will remove it from its neighborhood. If Y happens to be X's neighborhood edge, X will adjust (shrink) its neighborhood range. In the following example it is assumed that H=2. Assuming that node N100 initially has a neighborhood range of N80-N120 with nodes N80, N90, N110 and N120. If a new node N105 joins the federation and becomes introduced, N100 will add to its neighborhood and adjust its neighborhood range to N80-N110, which contains N80, N90, N105 and N110. Subsequently, if node N90 leaves the federation—as will be described in detail infra (e.g., a shutdown)—N100 will remove N90 from its neighborhood but retain the same range of N80-N110. It is to be appreciated that that this neighborhood is no longer complete because it contains only one node on the predecessor side. If node N110 also leaves the federation, N100 will further adjust its neighborhood range to be N80-N105 with nodes N80 and N105.

A more complex scenario involves the cases wherein a node requires extending its neighborhood. Accordingly, continuing with the previous example, if node N70 joins the federation and become introduced, node N80 cannot add N70 to its neighborhood and adjust its range to N70-N105 blindly, because there can be another node N75 that has also joined the federation as an advised node and thus extending the range to N70 can violate the consistency guarantee. Therefore, extending the neighborhood should be done with a guarantee that there does not exist any advised node within the extended range. Such rules can be specified as follows: For node X to extend its neighborhood edge from introduced node Y to another introduced node Z, the following are to be satisfied:

a. X does not know of any introduced node between Y and Z.
b. X is receiving a message from S which contains S's full neighborhood.
c. S's neighborhood range covers the range from Y to Z.
d. Every shutdown node between X and Z is known by S to be shutdown (this can be verified from the message).

In general, rule "d" is to prevent stale messages. For example, assuming that initially there are the following consecutive nodes in the federation: N40, N50, N60, N 70, N80, N90, N100, N110 and N120. Also, suppose that node N60 sends a message to N100 conveying N60's neighborhood which contains N40, N50, N70 and 80 with a range of N40-N80, and the message is delayed. Before the message reaches node N100, node N75 joins the federation and becomes advised. Now node N80 shuts down and node N100 shrinks its neighborhood edge from N80 to N90. Without rule d, when node N100 receives the delayed message from N60, it can extend its neighborhood edge to N70—yet such creates errors because it missed N75 and broke the consistency. With rule d, node N100 will perform the extension only if node N60 already knows that node N80 is down and therefore node N60's guarantee is still relevant. For example, if after node N80 shuts down node N70 notices such change and sends a message to node N100, this message can contain N75 and N90 in its neighborhood with a range of N50-N90, with the shutdown node information about node N80. Accordingly, all the rules are satisfied and node N100 can safely extend its neighborhood edge from N90 to N75.

Moreover, the actual neighborhood extension protocol can be as follows: When a node X detects that it does not have a complete neighborhood, it should send an EDGEPROBE message to its current neighborhood edge. The receiving node can reply with an EDGEPROBERESPONSE message. Both messages contain the sender's full neighborhood. This process is repeated until X has a complete neighborhood.

In the example, above, when node N100 detects that node N80 is down and therefore it no longer has a complete neighborhood, it should send an EDGEPROBE message to its current edge N90. With such message node N90 is notified that node N80 is down (if it has not known about it yet) and will respond with its neighborhood: N70, N75, N100 and N110. This message will enable node N100 to update its neighborhood and regain a complete neighborhood. It is noted that if node N90 (or N70) happens to send another message to node N100, it will achieve the same effect. It is to be appreciated that the EDGEPROBE message is a mere example for node N100 to ask latest information from its edge node to repair its neighborhood. Also note that message loss for either the EDGEPROBE or the EDGEPROBERE- SPONSE is not critical since the node detecting incomplete neighborhood will keep sending the EDGEPROBE message periodically.

Likewise, the rules described above can be employed for updating initial neighborhood. For example, if node N100 merely boots up with an empty neighborhood, it then receives a message from N110 that includes N110's view of neighborhood: N80, N90, N120 and N130, with a neighborhood range of N80-N130. Node N100 can then update its own neighborhood to be N80, N90, N110 and N120, with a range of N80—N120—wherein such update actually involves four neighborhood extensions, each extension meets the rules described above.

As illustrated in FIG. 3, a node N 310 joins the federation by routing join message to its own id via a seed node in the federation. Such join message is processed by a node closest to the joining node id, meaning it is either a successor or predecessor node to the joining node. In one particular example, it can be assumed that such node is the successor node S to N. After receiving the join response message from S, node N computes its predecessor node P and neighborhood nodes that are a fixed number (e.g., an integer—h) of nodes adjoining its id on the successor and predecessor sides. It synchronizes state with S (and P if state is not replicated) in preparation for inserting itself in the ring between P and S. Accordingly, N introduces itself to all the nodes in the neighborhood. During the process of introduction to the neighborhood nodes, N can learn new neighborhood nodes including other newly joining nodes. As such, introduction of N is an iterative process and it terminates when N hits the fix-point, meaning it has contacted all of its neighborhood nodes including other newly joining nodes and it did not learn any more new neighborhood members.

Figure 4:
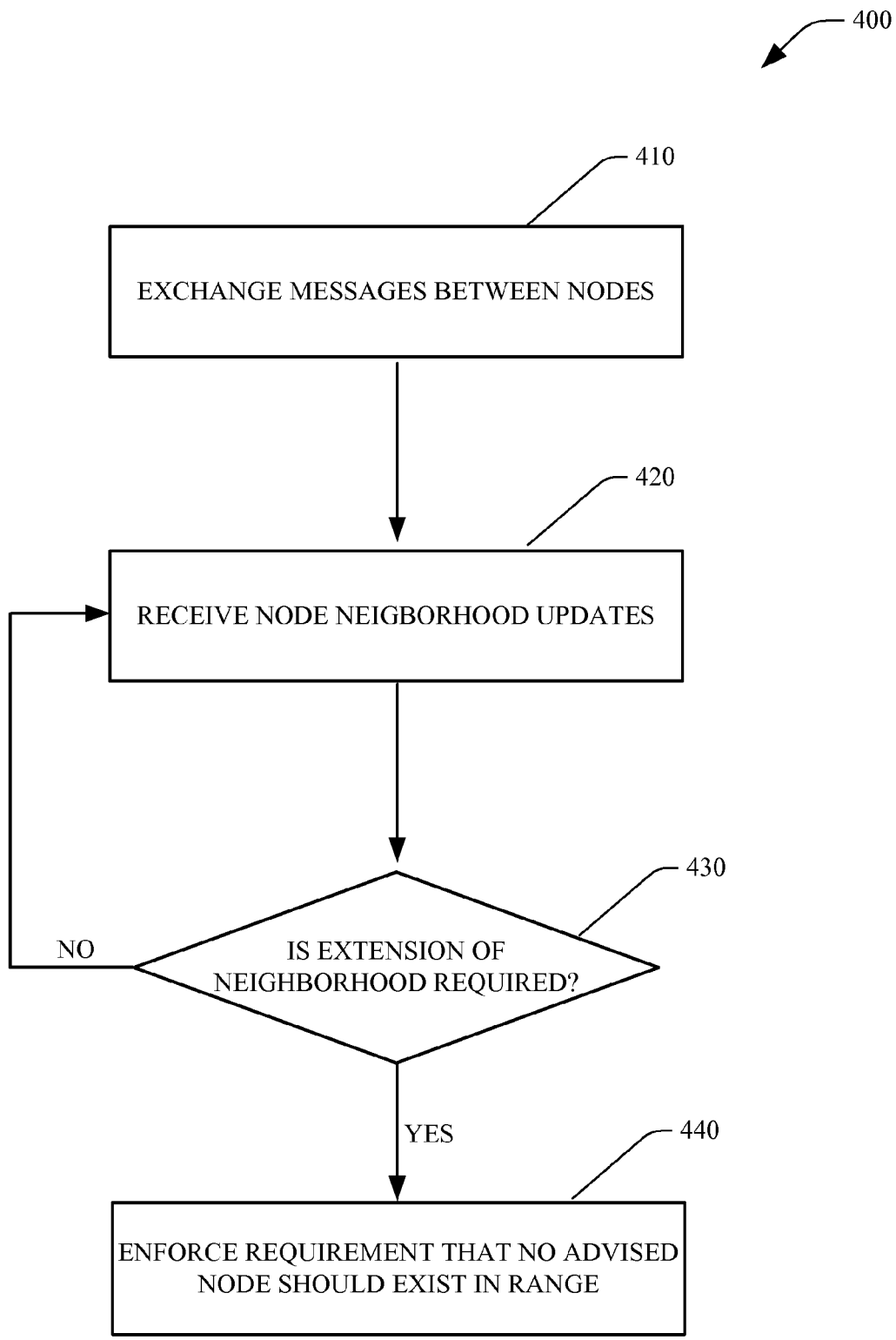
FIG. 4 illustrates a methodology of introducing an advised node according to an aspect of the subject innovation.

FIG. 4 illustrates a related methodology of a node joining a network according to an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Initially and at 410, nodes can exchange messages with each other, wherein for every message, the sending node can include nodes in its full neighborhood and its neighborhood range in the message. Subsequently, and at 420 the receiving node can update its neighborhood using the information in the message. At 430, a determination is made as to whether an extension of neighborhood nodes is required. If so, the methodology enforces at 440 a requirement that no advised node should exist in range.

Figure 5:
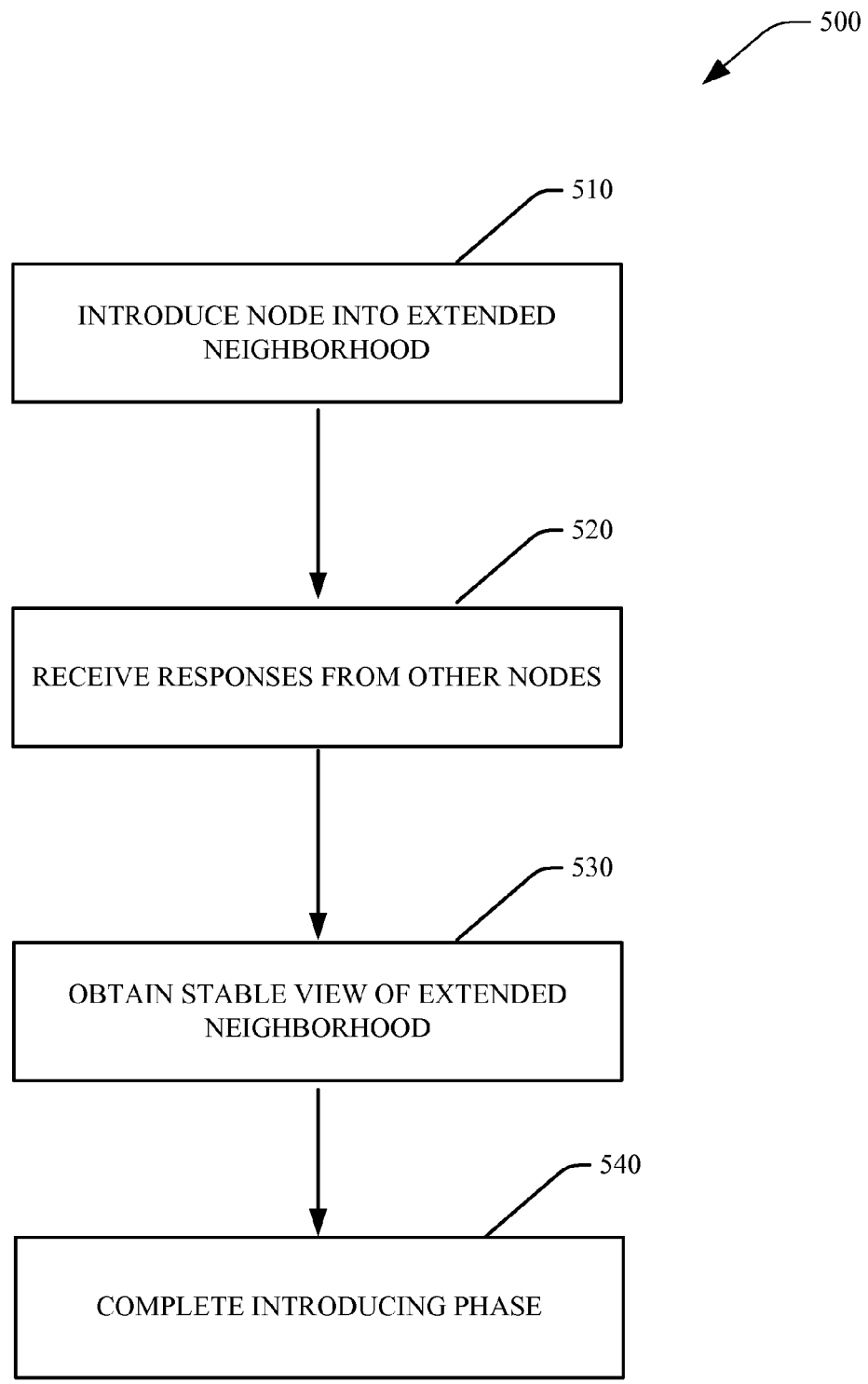
FIG. 5 illustrates a further methodology of completing an introducing phase according to an aspect of the subject innovation.

FIG. 5 illustrates an exemplary methodology 500 of joining a node to a federation according to an aspect of the subject innovation. Initially, and at 510 a node to be joined can be introduced into an extended neighborhood. Next, and at 520 responses from other nodes can be received and based thereon a stable view of the extended neighborhood can be obtained at 530. For example, such view can be obtained from updating views based on sending INTRODUCE messages, and responses associated therewith. At 540, the introducing phase can be completed and the node can become an introduced node.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

As used in this application, the terms "component", "system", are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 6:
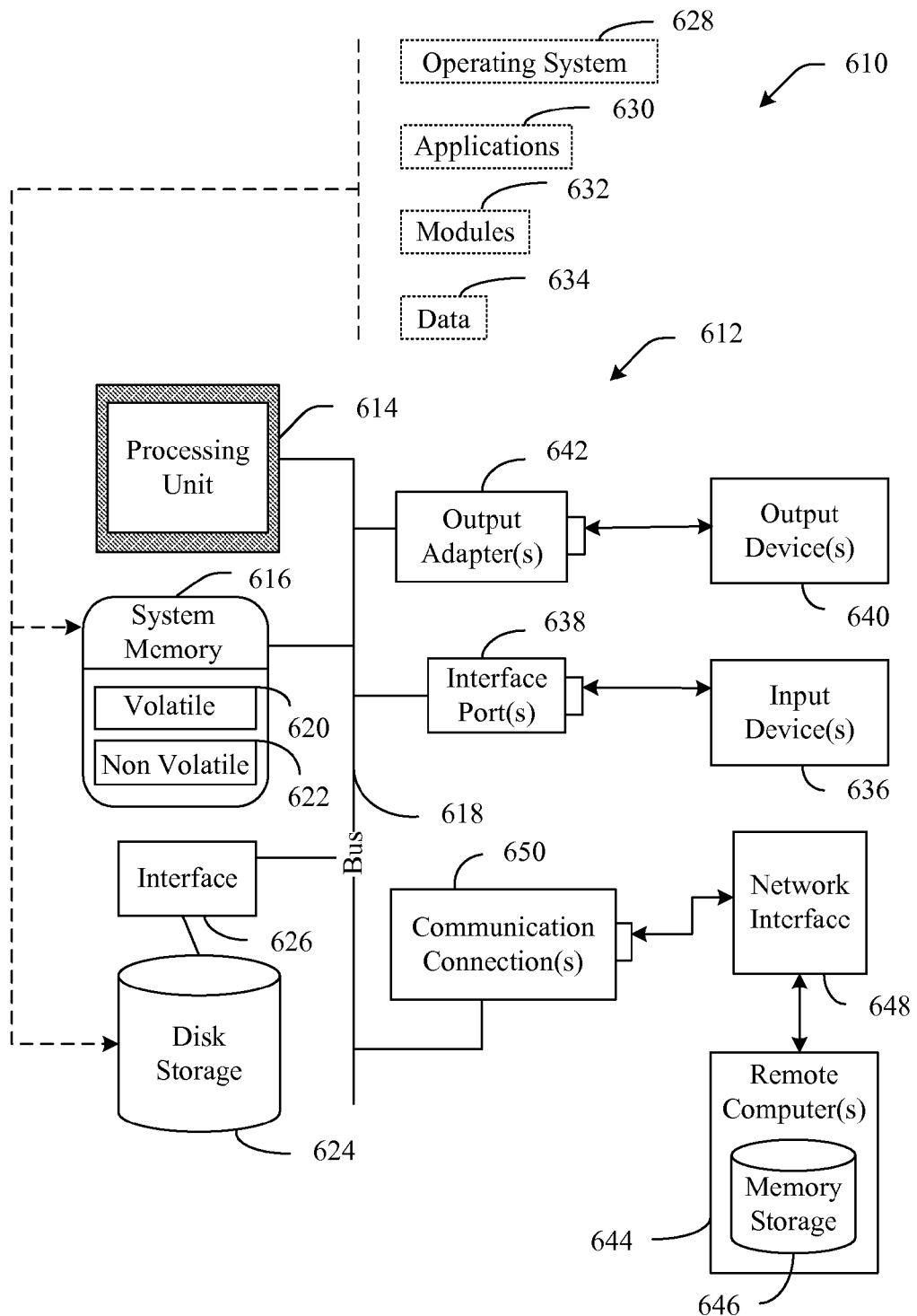
FIG. 6 illustrates an exemplary environment for implementing various aspects of the subject innovation.
Figure 7:
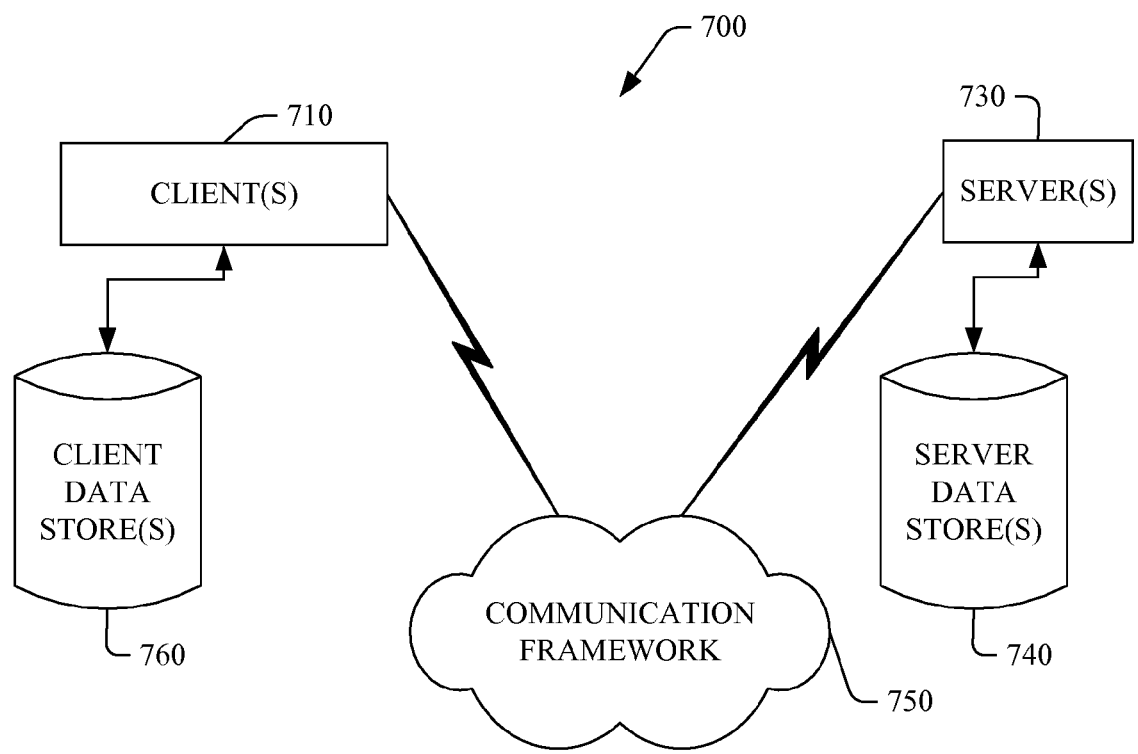
FIG. 7 is a schematic block diagram of a sample computing environment that can be employed for data retrieval according to an aspect of the subject innovation.

In order to provide a context for the various aspects of the disclosed subject matter, FIGS. 6 and 7 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, handheld computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 6, an exemplary environment 610 for implementing various aspects of the subject innovation is described that includes a computer 612. The computer 612 includes a processing unit 614, a system memory 616, and a system bus 618. The system bus 618 couples system components including, but not limited to, the system memory 616 to the processing unit 614. The processing unit 614 can be any of various available processors. Dual microprocessors and other multiprocessor architectures also can be employed as the processing unit 614.

The system bus 618 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 616 includes volatile memory 620 and nonvolatile memory 622. The basic input/output system (BIOS), containing the basic routines to transfer information between elements within the computer 612, such as during start-up, is stored in nonvolatile memory 622. For example, nonvolatile memory 622 can include read only memory (ROM), programmable ROM (PROM), electrically programmable ROM (EPROM), electrically erasable ROM (EEPROM), or flash memory. Volatile memory 620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 612 also includes removable/non-removable, volatile/non-volatile computer storage media. FIG. 6 illustrates a disk storage 624, wherein such disk storage 624 includes, but is not limited to, devices like a magnetic disk drive, floppy disk drive, tape drive, Jaz drive, Zip drive, LS-60 drive, flash memory card, or memory stick. In addition, disk storage 624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 624 to the system bus 618, a removable or non-removable interface is typically used such as interface 626.

It is to be appreciated that FIG. 6 describes software that acts as an intermediary between users and the basic computer resources described in suitable operating environment 610. Such software includes an operating system 628. Operating system 628, which can be stored on disk storage 624, acts to control and allocate resources of the computer system 612. System applications 630 take advantage of the management of resources by operating system 628 through program modules 632 and program data 634 stored either in system memory 616 or on disk storage 624. It is to be appreciated that various components described herein can be implemented with various operating systems or combinations of operating systems.

A user enters commands or information into the computer 612 through input device(s) 636. Input devices 636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 614 through the system bus 618 via interface port(s) 638. Interface port(s) 638 include, for example, a serial port, a parallel port, a game port, and a universal serial bus (USB). Output device(s) 640 use some of the same type of ports as input device(s) 636. Thus, for example, a USB port may be used to provide input to computer 612, and to output information from computer 612 to an output device 640. Output adapter 642 is provided to illustrate that there are some output devices 640 like monitors, speakers, and printers, among other output devices 640 that require special adapters. The output adapters 642 include, by way of illustration and not limitation, video and sound cards that provide a means of connection between the output device 640 and the system bus 618. It should be noted that other devices and/or systems of devices provide both input and output capabilities such as remote computer(s) 644.

Computer 612 can operate in a networked environment using logical connections to one or more remote computers, such as remote computer(s) 644. The remote computer(s) 644 can be a personal computer, a server, a router, a network PC, a workstation, a microprocessor based appliance, a peer device or other common network node and the like, and typically includes many or all of the elements described relative to computer 612. For purposes of brevity, only a memory storage device 646 is illustrated with remote computer(s) 644. Remote computer(s) 644 is logically connected to computer 612 through a network interface 648 and then physically connected via communication connection 650. Network interface 648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 650 refers to the hardware/software employed to connect the network interface 648 to the bus 618. While communication connection 650 is shown for illustrative clarity inside computer 612, it can also be external to computer 612. The hardware/software necessary for connection to the network interface 648 includes, for exemplary purposes only, internal and external technologies such as, modems including regular telephone grade modems, cable modems and DSL modems, ISDN adapters, and Ethernet cards.

FIG. 7 is a schematic block diagram of a sample-computing environment 700 that can be employed for implementing data retrieval, in accordance with an aspect of the subject innovation. The system 700 includes one or more client(s) 710. The client(s) 710 can be hardware and/or software (e.g., threads, processes, computing devices). The system 700 also includes one or more server(s) 730. The server(s) 730 can also be hardware and/or software (e.g., threads, processes, computing devices). The servers 730 can house threads to perform transformations by employing the components described herein, for example. One possible communication between a client 710 and a server 730 may be in the form of a data packet adapted to be transmitted between two or more computer processes. The system 700 includes a communication framework 750 that can be employed to facilitate communications between the client(s) 710 and the server(s) 730. The client(s) 710 are operatively connected to one or more client data store(s) 760 that can be employed to store information local to the client(s) 710. Similarly, the server(s) 730 are operatively connected to one or more server data store(s) 740 that can be employed to store information local to the servers 730.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system comprising at least one processor coupled to at least one machine-readable medium storing instructions executable by the at least one processor to implement:
    a link component configured to introduce an introducing node to a neighborhood of nodes of a communications network, at least in part by sending an introduce message to the neighborhood of nodes, the introduce message identifying a current view of neighboring nodes of the introducing node, the neighborhood of nodes including a predetermined number of nodes closest to the introducing node,
    wherein the link component is further configured to cause the introducing node to become an introduced node based on the current view becoming a stable view of the neighboring nodes of the introducing node, wherein in the stable view the current view does not change after responses to the introduce message are received; and
    a set of rules for controlling extending the neighborhood of nodes, the set of rules including a rule requiring that, for an extending node to extend an edge of a neighborhood of the extending node from a first introduced node to a second introduced node, the extending node has no entries in a routing table of the extending node of any introduced node between the first introduced node and the second introduced node.

2. The computer-implemented system of claim 1, the link component further comprising a join component configured to implement a join phase including sending, by a joining node, a join message to an identifier of the joining node.

3. The computer-implemented system of claim 2, wherein the link component is further configured to, if neighboring nodes of the introducing node go down, implement the join phase for the introducing node.

4. The computer-implemented system of claim 1, the link component further comprising an advisory component configured to send an advise message to an introduced node in the neighborhood of nodes, the advise message prompting a response identifying neighboring nodes of a responding node.

5. The computer-implemented system of claim 1, wherein a response to the introduce message includes an identification of neighboring nodes of a responding node.

6. The computer-implemented system of claim 1, wherein the predetermined number of nodes comprises an edge node in each of successor and predecessor node directions.

7. The computer-implemented system of claim 1, wherein the rule requires that, for the extending node to extend the edge of the neighborhood of the extending node from the first introduced node to the second introduced node, the extending node has no entries in the routing table of the extending node of any introduced node.

8. A computer-readable storage medium, the computer-readable storage medium being hardware and storing instructions, the instructions if executed by a computing device causing the computing device to perform operations comprising:
    by an introducing node, sending an introduce message to a neighborhood of nodes in a communications network, the introduce message identifying a current view of neighboring nodes of the introducing node;
    receiving a response from at least one node of the neighborhood of nodes, the response identifying neighboring nodes of the at least one node; and
    based on the current view being unchanged by the response, becoming an introduced node of the neighborhood of nodes in accordance with a set of rules for controlling extending the neighborhood of nodes, the set of rules including a rule requiring that, for an extending node to extend an edge of a neighborhood of the extending node from a first introduced node to a second introduced node, the extending node lacks entries in a routing table of the extending node of any introduced node between the first introduced node and the second introduced node.

9. The computer-readable storage medium of claim 8, the operations further comprising:
    adding the introduced node to the neighborhood of nodes.

10. The computer-readable storage medium of claim 8, the operations further comprising:
    by a joining node, targeting a join message to an identifier of the joining node.

11. The computer-readable storage medium of claim 10, the operations further comprising:
    by a neighboring node of the joining node closest to the joining node, receiving the join message.

12. The computer-readable storage medium of claim 11, the operations further comprising:
    by the neighboring node of the joining node closest to the joining node, responding to the join message with an identification of neighbors of the neighboring node closest to the joining node.

13. The computer-readable storage medium of claim 10, the operations further comprising:
    removing a shut-down node from the neighborhood of nodes.

14. The computer-readable storage medium of claim 8, wherein the rule requires that, for the extending node to extend the edge of the neighborhood of the extending node from the first introduced node to the second introduced node, the extending node lacks entries in the routing table of the extending node of any introduced node.

15. A method comprising:
    by a new node in a communications network, sending an introduce message to a plurality of neighboring nodes;
    receiving responses from the plurality of neighboring nodes, the responses identifying respective neighborhoods of the plurality of neighboring nodes; and
    becoming an introduced node to the plurality of neighboring nodes if after receiving the responses the current view is unchanged, in accordance with a set of rules for controlling extending the plurality of neighboring nodes, the set of rules including a rule requiring that, for an extending node to extend an edge of a neighborhood of the extending node from a first introduced node to a second introduced node, the extending node lacks entries in a routing table of the extending node of any introduced node between the first introduced node and the second introduced node.

16. The method of claim 15, further comprising:
by the new node, targeting a join message to an identifier of the new node.

17. The method of claim 16, further comprising:
by a closest neighboring node of the new node, receiving the join message.

18. The method of claim 17, further comprising:
by the closest neighboring node of the new node, responding to the join message with an identification of neighbors of the closest neighboring node of the new node.

19. The method of claim 15, further comprising:
by the introduced node, based on recognizing that a neighboring node is shut down, sending a message to another neighboring node containing information about the shut-down node; and
extending an edge of the plurality of neighboring nodes to a predecessor node of the shut-down node.

20. The method of claim 19, further comprising:
identifying the plurality of neighboring nodes in terms of a sorted list joined in a ring.

* * * * *